United States Patent Office 2,866,779
Patented Dec. 30, 1958

2,866,779
POLYMERIC 2-HYDROXYALKYL QUATERNARY SALTS AND PROCESS FOR THEIR PRODUCTION

James E. Pritchard and Peter J. Canterino, Bartlesville, Okla., assignors to Phillips Petroleum Company, a corporation of Delaware No Drawing. Application July 23, 1954
Serial No. 445,455

23 Claims. (Cl. 260—82.1)

This invention relates to polymeric 2-hydroxyalkyl pyridinium and quinolinium salts. In a further aspect, this invention relates to a process for the production of these salts which comprises treating a polymer of a heterocyclic nitrogen base of the pyridine and quinoline series containing a vinyl or isopropenyl (alpha-methylvinyl) group with an acid to form the corresponding salt and treating the resulting addition product with an epoxy compound.

Many different polymers have been prepared from these heterocyclic nitrogen bases containing a vinyl or isopropenyl group for which various specialized applications are known. Certain quaternary salts of these polymers are outstanding in their oil resistance. However, materials with improved oil resistance are desired.

We have discovered a group of polymeric materials which range from liquid to rubbery to solid resinous materials, depending upon the particular monomers employed and the method of preparation. This group of materials exhibits very satisfactory oil resistance and is particularly valuable in applications where oil resistant rubbery materials are desired. These materials can be compounded and the resulting stocks are particularly useful in applications where they come in contact with solvent materials, such as gaskets, fuel tank linings, hose, and the like.

Each of the following objects is obtained by at least one of the aspects of this invention.

An object of this invention is to prepare a new class of polymeric materials. A further object of this invention is to provide polymeric 2-hydroxyalkyl quaternary salts. A further object of this invention is to provide a method for the production of these salts.

Other objects and advantages of this invention will be apparent to one skilled in the art upon reading the accompanying disclosure.

According to the process of our invention, a polymer of a heterocyclic nitrogen base of the pyridine and quinoline series containing a vinyl or isopropenyl group is treated with an acid to form the corresponding pyridinium or quinolinium salt, and the resulting product is then treated with an epoxy compound, whereby the production of the corresponding polymeric 2-hydroxyalkyl quaternary salt is effected.

These reactions can be illustrated by the following structural formulae using, as a specific example of such a product, a portion of the molecule produced by polymerizing a 3-vinylpyridine and using ethylene oxide as the epoxy compound. HX represents an acid.

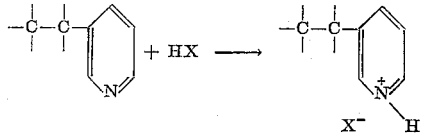

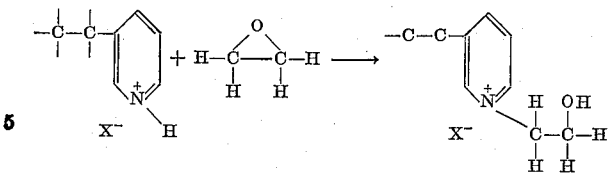

Specifically, and illustrating one of the preferred products of this invention, the product, when using styrene oxide as the epoxy compound, can be illustrated as follows:

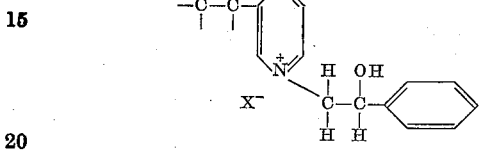

These 2-hydroxyalkyl compounds which have the hydroxy group in the polymer are capable of functioning as intermediates for the production of many additional compounds. The usual reactions of the hydroxy group are, of course, possible. This makes possible the production of esters, ethers, and the like. Furthermore, long chain ethers can be attached by means of this reactant hydroxy group. Another type of reaction which is possible is a method of cross-linking such chains by means of dicarboxy acids. This hydroxyl group is also capable of reacting with one or more additional molecules of the epoxy compound, this producing a polyether grouping on the original polymer chain.

New compositions of this invention are prepared from polymers of heterocyclic nitrogen bases of the pyridine and quinoline series containing a vinyl or isopropenyl group. Homopolymers, copolymers, terpolymers, etc., all produce valuable products. Monomers copolymerizable with these heterocyclic nitrogen bases include compounds containing an active $CH_2=C<$ group. Examples of such compounds which are widely used include styrene; substituted styrenes, such as alkyl, alkoxy, and halogenated substituted styrenes; acrylonitrile; methacrylonitrile; methyl acrylate; methyl methacrylate; ethyl acrylate; butyl acrylate; conjugated dienes, and the like. Also, polymers can be prepared from various mixtures of these heterocyclic nitrogen bases containing a vinyl or alpha-methylvinyl group and one or more conjugated dienes and one or more polymerizable materials containing the vinyl or isopropenyl group set forth above.

The polymeric starting materials can range from liquid to rubbery to solid resinous materials, depending upon the monomers employed and the method of preparation. For example, copolymers of a conjugated diene with a vinylpyridine, when prepared by emulsion polymerization, can range from liquid to rubbery products, depending upon the amount of modifier employed in the polymerization recipe.

The heterocyclic nitrogen bases which are applicable for the production of the polymeric starting materials are those of the pyridine and quinoline series which are copolymerizable with a conjugated diene and contain at least one $$CH_2=C\diagdown^R$$

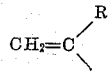

substituent wherein R is either hydrogen or a methyl group, i. e., the substituent is either a vinyl or an alpha-methylvinyl (isopropenyl) group. The

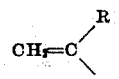

substituted heterocyclic nitrogen bases of the pyridine and quinoline series which are preferred are those having only one

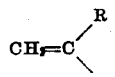

substituent and of these compounds those belonging to the pyridine series are most frequently used. Various alkyl-substituted derivatives are also applicable but it is generally preferred that the total number of carbon atoms in the nuclear substituted alkyl groups should not be greater than 12 and most frequently these alkyl substituents are methyl and/or ethyl.

The heterocyclic nitrogen bases are those having the formula

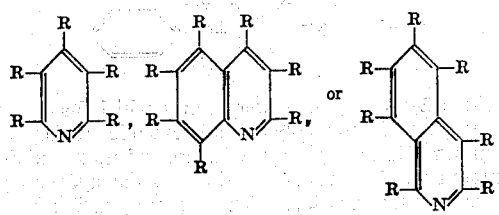

where R is selected from the group consisting of hydrogen, alkyl, vinyl, isopropenyl, nitro, alkoxy, halo, hydroxy, cyano, aryloxy, aryl, and combinations of these groups such as haloalkyl, alkylaryl, hydroxyaryl, and the like; at least one and not more than two of said groups being selected from the group consisting of vinyl and isopropenyl; and the total number of carbon atoms in the groups being not greater than 12, in addition to those carbon atoms in the vinyl and/or isopropenyl groups. Examples of such compounds are 2-vinylpyridine; 2-vinyl-5-ethylpyridine; 2,5-divinylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4,5-divinylpyridine; 2,4-dimethyl-5,6-dipentyl-3-vinylpyridine; 2-decyl-5-(alpha-methylvinyl)pyridine; 3,5-di(alpha-methylvinyl)pyridine; 3-nitro-2-vinylpyridine; 2-vinyl-4-hydroxy-5-nitropyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methylphenyl)-3-vinyl-4-methylpyridine; 3-vinyl-5-(hydroxyphenyl)pyridine; 2-vinylquinoline; 2-vinyl-4-ethylquinoline; 3-vinyl-6,7-di-n-propyl-quinoline; 2-methyl-4-nonyl-6-vinylquinoline; 4(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

The conjugated dienes employed are preferably those which contain from four to six, inclusive, carbon atoms per molecule and include 1,3-butadiene, isoprene, piperylene, methylpentadiene, 2,3-dimethyl-1,3-butadiene, chloroprene, and others. However, conjugated dienes having more than six, such as eight, carbon atoms per molecule can also be used. Furthermore, various alkoxy, such as methoxy and ethoxy, and cyano derivatives of these conjugated dienes, are also applicable.

Polymers employed as starting materials for the production of 2-hydroxyalkyl quaternary salts can be prepared by any method, such as mass or emulsion polymerization, and as hereinbefore mentioned, can range from liquid to rubbery to solid resinous polymers. For the preparation of these polymers, the vinyl heterocyclic nitrogen base component can range from 2 to 100 parts, and the copolymerizable material, can range from 98 to 0 parts by weight per 100 parts of monomeric material. The polymers should have a molecular weight of at least 300 and, preferably, at least 500 as determined by freezing point lowering in a suitable solvent.

In the process of this invention, the

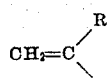

substituted heterocyclic nitrogen base polymers are first treated with an acid to convert the basic groups in the polymer to the pyridinium or quinolinium salt. Acids which are applicable include inorganic acids such as hydrochloric, hydrobromic, hydriodic, sulfuric, nitric, and phosphoric acids, and organic acids generally containing between one and four carbon atoms per molecule such as formic, acetic, propionic, butyric, oxalic, malonic, succinic, glycolic, chloroacetic, dichloroacetic, and trichloroacetic acids. The amount and type of acid employed is dependent upon the properties desired in the final product. Generally the polymer is treated with acid sufficient to react with from 10 to 100 percent of the basic groups in the polymer and preferably from 50 to 100 percent of the basic groups in the polymer. In many cases, an excess of acid, say up to 200 percent, is employed in order to insure that the basic groups in the polymer will be substantially completely converted to the respective quaternary salt.

In one method of operation, the vinyl heterocyclic nitrogen base polymer is prepared by emulsion polymerization and the polymer thus formed is coagulated in the conventional manner by the addition of brine and an acid such as hydrochloric acid. The polymer crumb is then washed with acid. This treatment converts the basic groups in the polymer substantially completely to the pyridinium or quinolinium salt. One of the advantages of our process is that the acid used serves two functions. It coagulates the polymer and also converts the basic groups present to the pyridinium or quinolinium salt. This method is suitable where the salts are not water soluble. When the salt is water soluble, the polymer can be coagulated by other methods, such as by using brine and/or alcohol.

A polymeric pyridinium salt, prepared in the manner described, is treated with an epoxy compound to effect conversion to the polymeric 2-hydroxyalkyl quaternary ammonium compound. The epoxy compound can be incorporated into the polymeric pyridinium salt by any method desired. In some cases it is possible to add the epoxy compound on the mill and continue the mixing procedure until the product is homogeneous. It is then cured at a temperature generally in the range between 100 and 400° F., preferably between 150 and 350° F., for a period in the range between 5 minutes and 120 hours, preferably between 15 minutes and 50 hours. The temperature and time of curing, or reaction between the epoxy compound and the polymeric pyridinium salt, will vary over a broad range, depending upon the particular polymeric salt employed and also upon the epoxy compound used. Also, at the higher temperatures, less time is required than when operating in the lower portions of the temperature range.

The epoxy compounds which are applicable are those having the formula

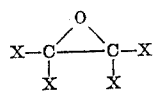

wherein X is a radical which (1) can be completely hydrocarbon in character including saturated aliphatic, saturated alicyclic, and aromatic radicals, (2) can contain ether linkages (C—O—C), (3) can contain halogen atoms, (4) can contain hydroxy radicals, (5) can be hydrogen, or (6) can contain any combination of the above radicals.

In addition, the two carbon atoms shown in the formula (1) can be part of a carbocyclic ring, (2) can be part of a heterocyclic ring containing carbon and oxygen atoms, or (3) can be part of an epoxy resin molecule which can also contain one or more of ether linkages, halogen atoms and hydroxy radicals.

The epoxides include the simplest, which is ethylene oxide, as well as those of complex structures such as the epoxy resins and can have a molecular weight ranging up to about 10,000 or more. They include materials which are normally gaseous, normally liquid and normally solid in character. As examples illustrating the types of compounds which are intended to be included are the following: ethylene oxide; propylene oxide (1,2-epoxypropane); butylene oxide (1,2-epoxybutane and 2,3-epoxybutane); 1,2-epoxypentane; 1,2-epoxy-3-methylbutane; 2,3-epoxy-3-methylbutane; 1,2-epoxy-2,4,4-trimethylpentane; 1,2-epoxycyclohexane; 1,2-epoxycyclooctane; 1,2-epoxy-4-cyclohexylpentane; 1,2-epoxyoctadecane; 1,2-epoxyeicosane; styrene oxide; 1,2-epoxy-3-chlorophenylpropane; 2,3-epoxy-5-ethoxydecane; 1,2-epoxy-4-chloromethylhexadecane; 1,2-epoxy-4-chlorocyclohexane; epichlorohydrin; epibromohydrin; 1,2-epoxy-4(2-hydroxyethyl)tridecane; and 5,6-epoxy-14-hydroxy-18-chloro-22-ethyltriacontane.

The epoxy resins, complex mixtures of glycidyl ethers, can range in molecular weight from 250 to about 10,000, and have a formula which is represented by

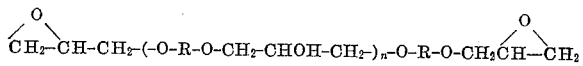

where R represents the divalent hydrocarbon radical of a dihydric phenol and $n$ is an integer of the series 0, 1, 2, 3, etc. Suitable dihydric phenols include mononuclear phenols like resorcinol, catechol, hydroquinone, etc., or polynuclear phenols like bis-(4-hydroxyphenyl)-2,2-propane-(bisphenol); 4,4'-dihydroxy benzophenone; bis-(4-hydroxyphenyl)-1,1-ethane; bis-(4-hydroxyphenyl)1,1-isobutane; bis-(4-hydroxylphenyl)-2,2-butane; bis-(4-hydroxy-2-methylphenyl) - 2,2-propane; bis-(4-hydroxy-2-tertiary butyl phenyl)-2,2-propane; bis-(2-dihydroxynaphthyl)-methane; 1,5-dihydroxy naphthalene; etc.

The amount of epoxy compound employed is generally based on the pyridinium salt units in the polymer. It will generally be in the range between 0.1 and 10 mols per pyridinium salt unit in the polymer. In some instances, the excess epoxy compound imparts certain desirable properties to the composition. An excess of the epoxy compound, i. e., an amount in addition to that required to react with the pyridinium salt units present in the polymer, can be employed so long as its compatibility in the polymer is not exceeded. Such an excess imparts a plasticizing action, such as disclosed in copending application of Pritchard and Canterino, Serial No. 445,456, filed July 23, 1954. This application is also related to a copending application of Pritchard and Canterino, Serial No. 445,457, filed July 23, 1954, wherein epoxy compounds are reacted with polymers of vinyl-substituted heterocyclic nitrogen bases having alkyl groups in the 2 and/or 4 positions.

The polymeric 2-hydroxyalkyl quaternary ammonium salts, as herein described, include various substituted derivatives of the 2-hydroxyalkyl group. For example, when the epoxy compound used is styrene oxide, a phenyl substituent is present and when epichlorohydrin is used, a chlorine substituent is present.

The products of this invention range from rubbery to hard resinous materials. They are much less suscepitble to swelling, when immersed in hydrocarbon solvents, than free base polymeric materials, or the corresponding acid pyridinium salts. They are, therefore, suited for the manufacture of rubber and resinous articles where oil resistance is an important factor. Rubbery products of the type described, which are compounded and cured, have good tensile strength and are much more oil resistant than similar materials prepared from polymeric pyridinium salts and compounded with the same materials except for using a commercial plasticizer instead of an epoxy compound. These compounded stocks are particularly useful in application where they come in contact with solvent materials, such as gaskets, fuel tank linings, hose and the like.

Examples of the practice of the procedure in the production of the new compounds of our invention are as follows:

*Example 1*

A butadiene/2-methyl-5-vinylpyridine rubbery copolymer was prepared by emulsion polymerization at 50° C. in accordance with the following recipe:

| | Parts by weight |
|---|---|
| 1,3-butadiene | 85 |
| 2-methyl-5-vinylpyridine | 15 |
| Water | 180 |
| Sodium fatty acid soap | 5 |
| $K_2S_2O_8$ | 0.3 |
| Mercaptan blend [1] | 0.3 |

[1] A blend of tertiary $C_{12}$, $C_{14}$ and $C_{16}$ aliphatic mercaptans in a ratio of 3 : 1 : 1 parts by weight.

The polymer was coagulated by treatment of the latex with brine and HCl and the polymer crumb was then washed with HCl. The acid treatment converted the pyridine units to the pyridinium salt.

Styrene oxide was incorporated into the polymeric pyridinium salt using an equivalent of one mol of styrene oxide per pyridinium salt unit in the copolymer (15.6 parts styrene oxide per 100 parts butadiene/2-methyl-5-vinylpyridine copolymer). The materials were incorporated by mill mixing and the resulting composition was cured one hour at 270° F. The product had the appearance of a cured sample of gum stock, i. e., it was a soft and snappy rubbery material. It was readily removed from the curing mold and the specimen retained its sharp edges.

A similar run was made except that the free polymeric base, instead of the pyridinium salt, was employed. Styrene oxide was incorporated into the polymer and the mixture cured in the same manner. The cured sample had a similar appearance in some respects to that obtained when the polymer hydrochloride was treated with styrene oxide but it was more difficult to mold. The reaction with the free base is claimed in our copending application Serial No. 445,456, filed July 23, 1954.

Other runs were made for comparative purposes using the polymer hydrochloride and also the free polymeric base but no styrene oxide. Two runs were made with a 70/30 butadiene/styrene copolymer, one with, and the other without, styrene oxide. Tests for swelling and extractability were made by immersing weighed samples in a mixture containing 70 percent isooctane and 30 percent toluene at 25° C. for 48 hours. The volume percent swell was determined by noting the volume of a test specimen before and after immersion in the isooctane-toluene mixture. Extractability was determined by drying the sample at 70° C. for 48 hours and weighing it. From the difference in weight before and after immersion in the isooctane-toluene mixture, the extractability was calculated.

The table which follows shows the different materials tested, results of swelling and extractability tests, and condition of the swollen test specimen.

| Material Tested | Styrene Oxide | Percent Swelled | Percent Extracted | Condition of Swollen Test Specimen |
|---|---|---|---|---|
| BD/MVP. HCl [1] | Present | 220 | 13 | Coherent sample. |
| BD/MVP.[2] | do | 490 | 11 | Do. |
| 70/30 BD/St [3] | do | | | Not capable of measurement, partially disintegrated. |
| BD/MVP. HCl [1] | Absent | | | Do. |
| BD/MVP.[2] | do | | | Do. |
| 70/30 BD/St [3] | do | | | Do. |

[1] Pyridinium salt prepared by action of HCl on an 85/15 butadiene/2-methyl-5-vinylpyridine copolymer.
[2] 85/15 Butadiene/2-methyl-5-vinylpyridine copolymer (free base).
[3] 70/30 Butadiene/styrene copolymer.

Example II

An 85/15 butadiene/2-methyl-5-vinylpyridine rubbery copolymer was prepared by emulsion polymerization at 50° C. in the manner described in Example I, and then converted into the pyridinium salt by treatment with hydrochloric acid. The resulting product was compounded using the recipe given below. In one run the epoxy compound employed in the compounding recipe was styrene oxide and in a second run epichlorohydrin was used. A control run was made in which TP-90B (a commercial plasticizer) was employed instead of an epoxy compound.

| | Parts by weight |
|---|---|
| Polymeric pyridinium salt | 100 |
| Carbon black (Philblack A) | 60 |
| Sulfur | 1.5 |
| Altax [1] | 1.5 |
| Zinc oxide | 5 |
| TP-90B [2] | 10 or 0 |
| Styrene oxide or epichlorohydrin | 0 or 10 |

[1] Benzothiazyl disulfide.
[2] Dibutyl carbitol formal.

The compounded stocks were cured 45 minutes at 307° F. and tensile strength and swelling tests were made. Volume percent swell was determined by immersing samples of the compounded stocks in a mixture containing 70 percent isooctane and 30 percent toluene at 158° F. for 48 hours. The following results were obtained:

| | Styrene Oxide | Epichlorohydrin | TP-90B |
|---|---|---|---|
| Tensile, p. s. i. | 2,570 | 2,740 | 2,780 |
| Swell, percent | 114 | 79 | 154 |

It should be understood that many variations and modifications are possible in the preferred procedure set forth above, without departing from the basic concept of our invention.

We claim:

1. N-(2-hydroxyalkyl) quaternary ammonium compounds of heterocyclic nitrogen base polymers selected from the group consisting of polymers of vinylpyridines and polymers of vinylquinolines.

2. N-(2-hydroxyalkyl) quaternary ammonium salts of vinylpyridine polymers.

3. N-(2-hydroxyalkyl) quaternary ammonium salts of vinylquinoline polymers.

4. The N-(2-hydroxy-2-phenylethyl) quaternary ammonium chloride of a polymer of butadiene and 2-methyl-5-vinylpyridine.

5. The N-(2-hydroxy-3-chloropropyl) quaternary ammonium chloride of a polymer of butadiene and 2-methyl-5-vinylpyridine.

6. A process of preparing N-(2-hydroxyalkyl) quaternary ammonium compounds of heterocyclic nitrogen bases comprising treating a polymer of a compound selected from the group consisting of

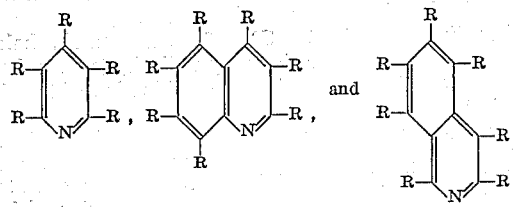

where R is selected from the group consisting of hydrogen, alkyl, vinyl, isopropenyl, nitro, alkoxy, halo, hydroxy, cyano, aryloxy and aryl groups and combinations of these groups, at least one and not more than two substituents being selected from the group consisting of vinyl and isopropenyl, with an acid to convert the basic groups to the salt, and contacting said salt with an epoxy compound wherein an oxygen atom bridges adjacent carbon atoms to produce the N-(2-hydroxyalkyl) quaternary ammonium compounds.

7. The process of claim 6 in which the heterocyclic nitrogen base is 2-methyl-5-vinylpyridine.

8. The process of claim 6 in which said polymer is a copolymer of a polymerizable nitrogen base containing a group selected from the group consisting of active vinyl and alpha-methylvinyl groups and at least one additional monomer copolymerizable therewith containing a group selected from the group consisting of vinyl and isopropenyl.

9. The process of claim 8 in which said copolymer is prepared using at least 2 percent by weight of said heterocyclic nitrogen base based upon the total monomeric mixture.

10. The process of claim 9 in which said heterocyclic nitrogen base is 2-vinylpyridine.

11. The process of claim 9 in which said heterocyclic nitrogen base is 2-methyl-5-vinylpyridine.

12. The process of claim 6 in which said epoxy compound is selected from the group consisting of

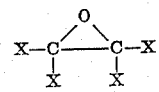

where X is selected from the group consisting of substituted and unsubstituted hydrocarbon radicals and wherein the two carbon atoms can be part of a cyclic ring structure; and epoxy resins having a molecular weight of 250 to 10,000.

13. The process of claim 6 in which said epoxy compound is employed in the range of 0.1 to 10 epoxide groups per salt unit in the polymer.

14. The process of claim 6 in which said acid is used in the amount sufficient to react with 10 to 100 percent of the basic groups in the polymer.

15. The process of claim 6 in which said salt is reacted with said epoxy compound at a temperature between 100 and 400° F. for 5 minutes to 120 hours.

16. The process of claim 6 in which said salt is reacted with said epoxy compound at a temperature between 150 and 350° F. for 15 minutes to 50 hours.

17. A process for preparing polymeric 2-hydroxyalkyl quaternary ammonium compounds comprising polymerizing a monovinylpyridine selected from the group consisting of unsubstituted and alkyl substituted monovinylpyridines; treating the resulting polymer with an acid to form the corresponding pyridinium salt, the amount of said acid being sufficient to react with 10 to 100 percent of the basic groups in the polymer; contacting said salt with an epoxy compound wherein an oxygen atom bridges adjacent carbon atoms at a temperature of 100 to 400° F., the amount of said epoxy compound being 0.1 to 10 mols per salt unit in the polymer; and recovering the resulting polymeric 2-hydroxyalkyl pyridinium salt.

18. The process of claim 17 in which said polymer is a copolymer of said monovinylpyridine and a second monomer containing a group selected from the group consisting of vinyl and isopropenyl.

19. A process for preparing a polymeric 2-hydroxyalkyl quaternary ammonium compound comprising treating a butadiene/2-methyl-5-vinylpyridine copolymer with an acid to form the corresponding pyridinium salt, the amount of said acid being sufficient to react with 10 to 100 percent of the basic groups in the polymer; contacting said salt with an epoxy compound wherein an oxygen atom bridges adjacent carbon atoms at a temperature of 100 to 400° F., the amount of said epoxy compound being 0.1 to 10 mols per salt unit in the polymer; and recovering the resulting polymeric 2-hydroxyalkyl pyridinium salt.

20. A process for preparing the N-(2-hydroxy-2-phenylethyl) quaternary ammonium chloride of a butadiene/2-methyl-5-vinylpyridine copolymer comprising copolymerizing, in aqueous emulsion, butadiene and 2-methyl-5-vinylpyridine, said 2-methyl-5-vinylpyridine comprising at least 2 percent by weight of the total monomers charged, coagulating and washing the copolymer with hydrochloric acid, adding styrene oxide in an amount equivalent to one mol of said oxide per pyridinium salt unit in the copolymer; and heating the mixture of styrene oxide and pyridinium salt to produce the desired compound.

21. The process of preparing the N-(2-hydroxy-2-phenylethyl) quaternary ammonium chloride of a polymer prepared by polymerizing butadiene and 2-methyl-5-vinylpyridine in a ratio of 85 parts by weight of butadiene to 15 parts by weight of 2-methyl-5-vinylpyridine comprising, treating said polymer with hydrochloric acid to convert the pyridine units to the pyridinium salt, milling styrene oxide with said pyridinium salt, and heating the resulting composition at a temperature of 100 to 400° F.

22. A process for preparing the N-(2-hydroxy-3-chloropropyl) quaternary ammonium chloride of a butadiene/2-methyl-5-vinylpyridine copolymer comprising copolymerizing in aqueous emulsion butadiene and 2-methyl-5-vinylpyridine, said 2-methyl-5-vinylpyridine comprising at least 2 percent by weight of the total monomers charged; coagulating and washing the copolymer with hydrochloric acid; adding epichlorohydrin in an amount equivalent to one mol of said epichlorohydrin per pyridinium salt unit in the copolymer; and heating the mixture of epichlorohydrin and pyridinium salt to produce the desired compound.

23. The process of producing N-(2-hydroxy-3-chloropropyl) quaternary ammonium chloride of a polymer prepared by polymerizing butadiene and 2-methyl-5-vinylpyridine in a ratio of 85 parts by weight of butadiene to 15 parts by weight of 2-methyl-5-vinylpyridine comprising, treating said polymer with hydrochloric acid to convert the pyridine units to the pyridinium salt, treating said pyridinium salt with epichlorohydrin and heating the resulting composition at a temperature of 100 to 400° F.

References Cited in the file of this patent
UNITED STATES PATENTS

| | | |
|---|---|---|
| 2,484,430 | Sprague et al. | Oct. 11, 1949 |
| 2,487,829 | Richards | Nov. 15, 1949 |
| 2,619,445 | Kalafus | Nov. 25, 1952 |
| 2,676,166 | Webers | Apr. 20, 1954 |